(12) United States Patent
Eser et al.

(10) Patent No.: US 10,941,731 B2
(45) Date of Patent: Mar. 9, 2021

(54) DEVICE FOR OPERATING A TANK VENTILATION SYSTEM OF AN INTERNAL COMBUSTION ENGINE

(71) Applicant: Vitesco Technologies GMBH, Hannover (DE)

(72) Inventors: Gerhard Eser, Hemau (DE); Florian Kleiner, Kehlheim (DE); Erwin Achleitner, Obertaubling (DE); Gerhard Haft, Maxhütte-Haidhof (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/903,546

(22) Filed: Jun. 17, 2020

(65) Prior Publication Data

US 2020/0309069 A1    Oct. 1, 2020

Related U.S. Application Data

(63) Continuation of application No. PCT/EP2018/084378, filed on Dec. 11, 2018.

(30) Foreign Application Priority Data

Dec. 19, 2017    (DE) ..................... 10 2017 223 277.3

(51) Int. Cl.
*F02M 25/08*    (2006.01)
*B01D 53/04*    (2006.01)
(Continued)

(52) U.S. Cl.
CPC ..... *F02M 25/0836* (2013.01); *B01D 53/0446* (2013.01); *B01D 53/0454* (2013.01);
(Continued)

(58) Field of Classification Search
CPC ....... F02M 25/0836; F02M 2025/0845; F02M 25/089; F02M 25/0854; B01D 53/0446;
(Continued)

(56) References Cited

U.S. PATENT DOCUMENTS

2011/0307157 A1    12/2011  Pursifull et al.
2013/0008162 A1     1/2013  Ruona et al.

FOREIGN PATENT DOCUMENTS

DE    4134199 A1    4/1993
DE    19813321 A1   10/1999
(Continued)

OTHER PUBLICATIONS

International Search Report and Written Opinion dated Mar. 21, 2019 from corresponding International Patent Application No. PCT/EP2018/084378.

(Continued)

*Primary Examiner* — Audrey K Bradley
*Assistant Examiner* — Edward Bushard

(57) ABSTRACT

The disclosed embodiments relate to a device for operating a tank ventilation system of an internal combustion engine. This device has a fuel tank, an activated carbon filter for collecting and buffering fuel vapors escaping from the fuel tank, a purge air pump and a control unit. The outlet of the purge air pump is connected to the intake tract of the internal combustion engine via a first tank venting valve and connected to the exhaust tract of the internal combustion engine via a second tank venting valve.

16 Claims, 7 Drawing Sheets

(51) Int. Cl.
  *B01D 53/94* (2006.01)
  *B60K 15/03* (2006.01)
  *F01N 3/029* (2006.01)
  *F01N 3/10* (2006.01)
  *F01N 3/22* (2006.01)
  *F01N 3/24* (2006.01)
  *F02D 41/22* (2006.01)

(52) U.S. Cl.
  CPC ......... *B01D 53/9454* (2013.01); *B60K 15/03* (2013.01); *F01N 3/029* (2013.01); *F01N 3/101* (2013.01); *F01N 3/22* (2013.01); *F01N 3/24* (2013.01); *F02D 41/22* (2013.01); *F02M 25/0854* (2013.01); *B01D 2253/102* (2013.01); *B01D 2257/702* (2013.01); *B01D 2259/401* (2013.01); *B01D 2259/40086* (2013.01); *B01D 2259/4516* (2013.01); *F02D 2041/225* (2013.01)

(58) Field of Classification Search
  CPC ............ B01D 53/0454; B01D 53/9454; B01D 2253/102; B01D 2257/702; B01D 2259/40086; B01D 2259/401; B01D 2259/4516; B60K 15/03; Y02T 10/12; F01N 3/0253; F01N 3/32; F01N 3/035; F01N 3/30; F01N 3/029; F01N 3/101; F01N 3/22; F01N 3/24; F02D 41/0035; F02D 41/0245; F02D 41/029; F02D 41/0032; F02D 41/22; F02D 2041/225
  See application file for complete search history.

(56) References Cited

FOREIGN PATENT DOCUMENTS

| | | |
|---|---|---|
| DE | 10005909 A1 | 8/2001 |
| DE | 10201186946 A1 | 3/2011 |
| DE | 102010046747 A1 | 3/2011 |
| DE | 102013221794 A1 | 4/2015 |
| DE | 102013221797 A1 | 4/2015 |
| EP | 864356 A1 | 9/1998 |
| EP | 2627889 A1 | 8/2013 |
| JP | 200407673 A1 | 3/2004 |
| WO | 2010088438 A2 | 8/2010 |

OTHER PUBLICATIONS

German Office Action dated Jun. 21, 2018 for corresponding German Patent Application No. 10 2017 223 277.3.

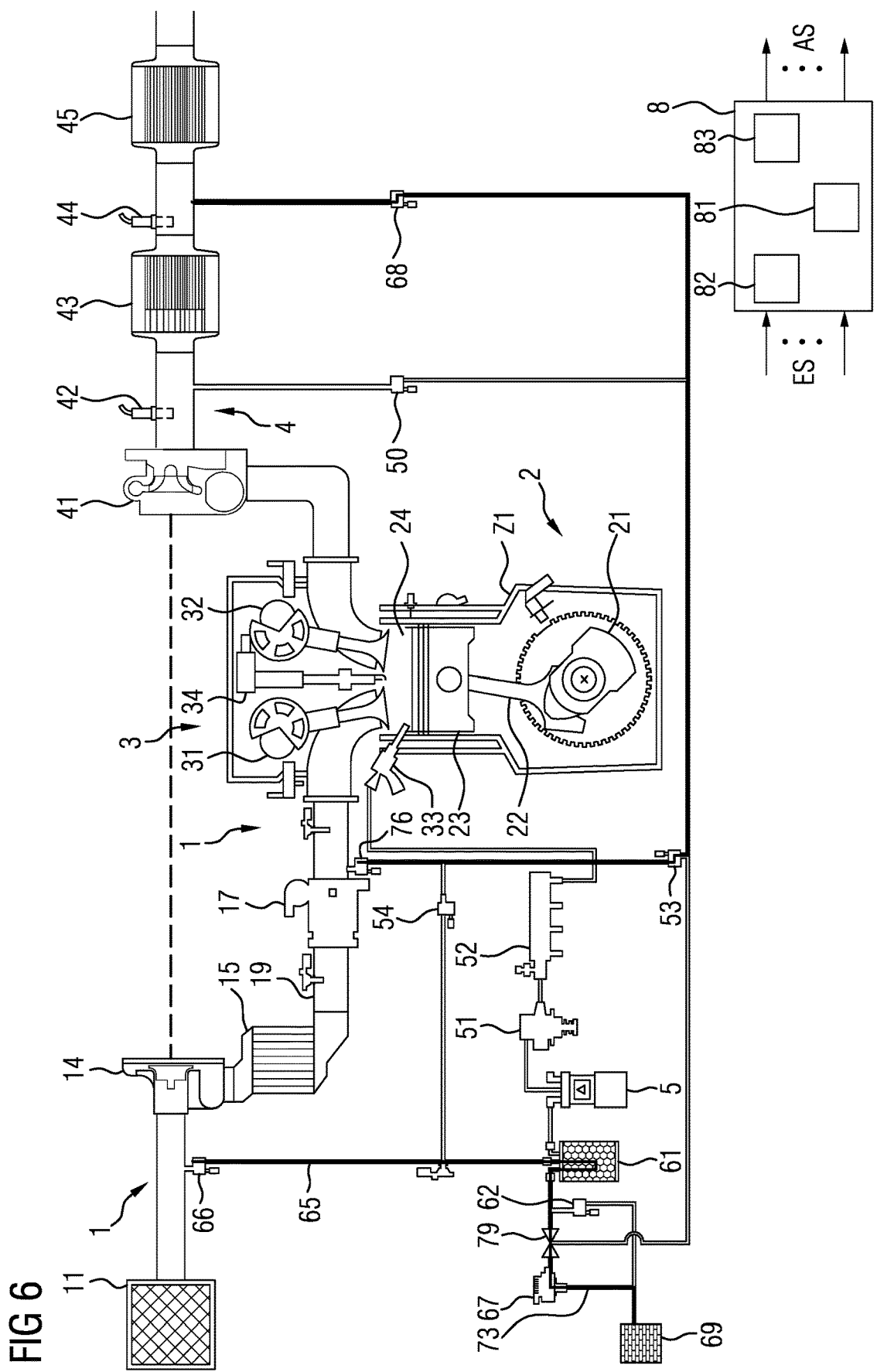

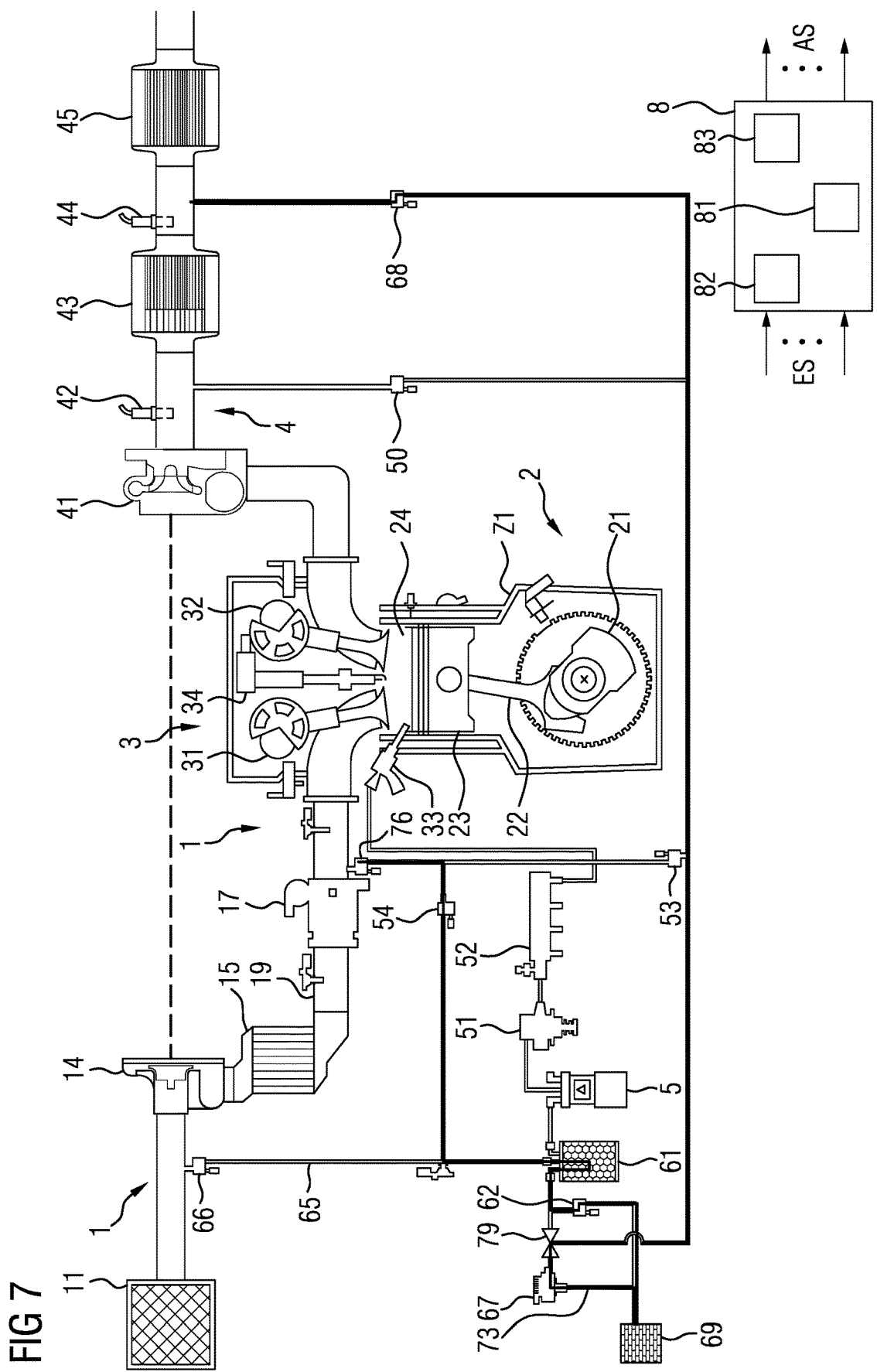

DEVICE FOR OPERATING A TANK VENTILATION SYSTEM OF AN INTERNAL COMBUSTION ENGINE

CROSS REFERENCE TO RELATED APPLICATIONS

This application claims the benefit of PCT Application PCT/EP2018/084378, filed Dec. 11, 2018, which claims priority to German Application DE 10 2017 223 277.3, filed Dec. 19, 2017. The above applications are incorporated herein by reference.

FIELD OF INVENTION

The invention relates to a device for operating a tank ventilation system of an internal combustion engine.

BACKGROUND

EP 2 627 889 B1 discloses a method and a device for operating a tank ventilation system in which the purge air is extracted from an absorption tank, and the purge air extracted is mixed with the intake air in an intake passage of an internal combustion engine, and the density of the purge air and the purge air mass flow are determined. The information obtained on the purge air mass flow can be used for feedforward control of a closed-loop lambda control system and/or to control the fuel metering.

SUMMARY

It is the object of the invention to specify a device for operating the tank ventilation system of an internal combustion engine, the scope of operation of which is expanded.

The advantages of the invention, in particular, are that the purge air delivered by the purge air pump may not only be used for introduction into the intake tract of the internal combustion engine but, in addition, may also be passed into the exhaust tract of the internal combustion engine in order to contribute there to more rapid heating of a three-way catalytic converter, of a four-way catalytic converter and/or to regeneration of a particulate filter.

BRIEF DESCRIPTION OF THE DRAWINGS

Further advantageous characteristics of the invention will emerge from the exemplary explanation thereof below on the basis of the figures. In the figures:

FIG. 6 shows a block diagram of a device for operating a tank ventilation system of an internal combustion engine in accordance with a fifth embodiment, and FIG. 7 shows a block diagram of a device for operating a tank ventilation system of an internal combustion engine in accordance with a sixth embodiment.

DETAILED DESCRIPTION

Figure 1:
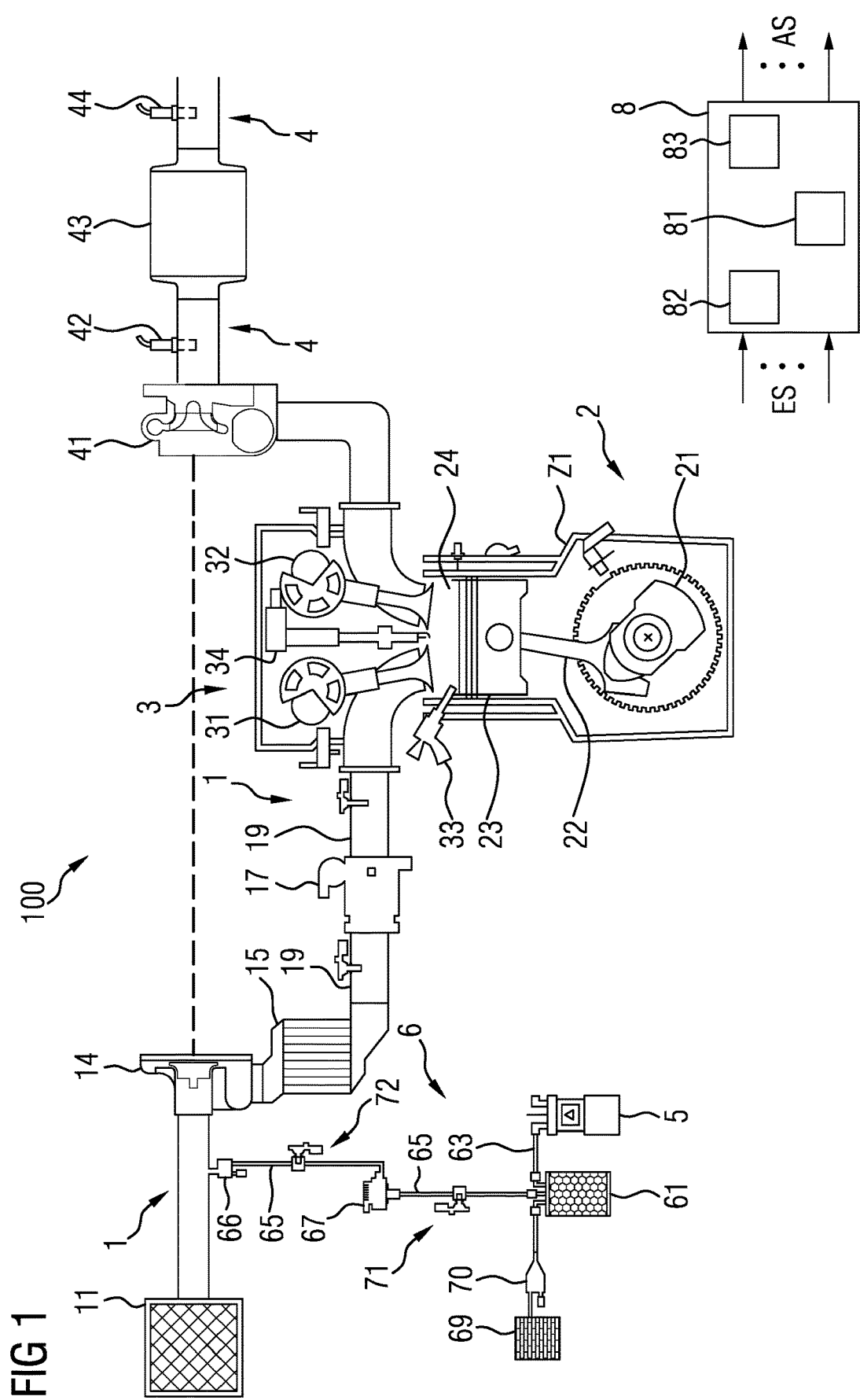
FIG. 1 shows a block diagram intended to illustrate the operation of a device for operating a tank ventilation system of an internal combustion engine.

FIG. 1 shows a block diagram intended to illustrate the operation of a device for operating a tank ventilation system of an internal combustion engine. The device illustrated shows an internal combustion engine 100, which contains inter alia an intake tract 1, an engine block 2, a cylinder head 3, an exhaust tract 4, a fuel tank 5, a tank ventilation device 6 and a pressure charging device 14, 41 in the form of an exhaust gas turbocharger, and a control unit 8. In the interests of clarity, only those parts are drawn here that are necessary for an understanding of the invention. In particular, only one cylinder Z1 of the internal combustion engine is shown.

In the flow direction of the intake air and starting from an air filter 11, the intake tract 1 includes a compressor 14 of the exhaust gas turbocharger, a charge air cooler 15, a throttle valve 17, and an intake pipe 19, which leads into the engine block 2, to the cylinder Z1, via an intake duct. The throttle valve 17 may take the form of a throttle element (E gas) controlled by an electric motor, whose opening cross-section, in addition to the actuation by the driver (driver request), may be adjusted, depending on the operating zone of the internal combustion engine 100, via control signals output by the control unit 8. At the same time a signal is output to the control unit 8 for monitoring and checking the position of the throttle valve 17.

The engine block 2 includes a crankshaft 21, which is coupled via a connecting rod 22 to a piston 23 of the cylinder Z1. The motive power generated by the combustion process is transmitted via the crankshaft 21 to a drive train (not shown in FIG. 1). The piston 23 and the cylinder Z1 define a combustion chamber 24.

The cylinder head 3 includes a valve drive with at least one gas inlet valve 31, at least one gas outlet valve 32, and drive devices (not shown in detail) for these valves. Here this takes the particular form of a so-called variable valve drive, in which the actuation of the at least one gas inlet valve 31 and/or the at least one gas outlet valve 32 is largely, or even fully, decoupled from the movement of the crankshaft 21. The cylinder head 3 also includes a fuel injector 33 and a spark plug 34.

The exhaust tract 4 leads off from the combustion chamber 24, in the further course of which are arranged a turbine 41 of the exhaust gas turbocharger, which is connected to the compressor 14 via a shaft (not further identified), exhaust gas sensors implemented as lambda probes 42 and 44, and a catalytic converter 43. By evaluation of the measurement signals supplied by the lambda probes, it is possible to perform a diagnosis of the functioning capacity of the three-way catalytic converter. Moreover, the output signals of the lambda probes 42 and 44 are used for conventional closed-loop lambda control.

The catalytic converter 43 may be designed as a three-way catalytic converter and/or as an electrically heated catalytic converter. Furthermore, a particulate filter may be provided in the exhaust tract 4, and this may also be integrated into the catalytic converter 43.

A bypass around the compressor 14 of the exhaust gas turbocharger with a divert-air valve, and a bypass around the turbine of the exhaust gas turbocharger with a wastegate valve, are not shown in the interests of clarity.

A fuel supply unit (only partially shown) is assigned to the internal combustion engine 100; this supplies the fuel injector 33 with fuel. Here the fuel is conveyed in a known manner from a fuel tank 5 by an electric fuel pump (in-tank pump, low-pressure fuel pump) with a pre-filter, usually arranged within the fuel tank, at a low pressure, which is typically less than 5 bar, and is then led via a low-pressure fuel line containing a fuel filter to an inlet of a high-pressure fuel pump. This high-pressure fuel pump is driven either mechanically by means of a coupling with the crankshaft 21 of the internal combustion engine 100, or electrically. It increases the fuel pressure in an Otto-cycle gasoline driven internal combustion engine 100 to a value of typically 200-300 bar, and pumps the fuel via a high-pressure fuel line into a high-pressure fuel accumulator (common rail, not shown in the figure), to which is connected a supply line for the fuel injector 33 and which thus supplies the fuel injector 33 with pressurized fuel, so that fuel may be injected into the combustion chamber 24.

The pressure in the high-pressure fuel accumulator is detected by a pressure sensor. Depending on the signal from this pressure sensor, the pressure in the high-pressure fuel accumulator is set to either a constant or a variable value by means of a flow-controlled fuel pump or by means of a pressure regulator. Excess fuel is returned either to the fuel tank 5 or to the inlet line of the high-pressure fuel pump.

A tank ventilation device 6 is also assigned to the internal combustion engine 100. An activated carbon filter 61 belongs to the tank ventilation device 6; this is connected via a connecting line 63 to the fuel tank 5. The fuel vapors which form in the fuel tank 5, especially the volatile hydrocarbons, are led into the activated carbon filter 61 and are adsorbed by the activated carbon contained therein.

The activated carbon filter 61 is connected via a regeneration line 65 to the intake tract 1 at a location downstream of the air filter 11 and upstream of the compressor 14. To adjust the gas flow in the regeneration line 65, a tank venting valve 66, which may be controlled by means of control signals from the control unit 8, is provided. The activation signal takes the form, in particular, of a pulse width modulated signal (PWM signal).

In order that purging and thus regeneration of the activated carbon filter 61 may take place even with a dethrottled intake pipe or in pressure-charged operation of the internal combustion engine 100, an electrically driven purge air pump 67 is arranged in the regeneration line 65.

Furthermore, an air admission line is provided on the activated carbon filter 61, which connects to the environment via an air filter 69. In this air admission line is arranged an air admission valve 70, which may be controlled by means of control signals from the control unit 8.

The purge air pump 67 may be embodied as an electrically driven centrifugal pump, and its speed may be controlled.

Upstream of the purge air pump 67, a pressure sensor 71 is provided in the regeneration line 65; this supplies a pressure value p_up corresponding to the pressure at the inlet to the purge air pump 67. The pressure sensor 71 may also be integrated with a temperature sensor to form one component, so that the density of the purge gas and thus the vaporous fuel mass introduced into the intake tract 1 may also be determined from an evaluation of these signals.

Downstream of the purge air pump 67, a pressure sensor 72 is provided in the regeneration line 65; this supplies a pressure value p_down corresponding to the pressure at the outlet of the purge air pump 67.

Instead of two separate pressure sensors 71, 72, it is also possible to use a differential pressure sensor, which supplies a signal corresponding to the pressure difference $\Delta P = p\_down - p\_up$.

Various sensors are associated with the control unit 8; these detect measured variables and determine the measured values of the measured variables. Operating variables include not only the measured variables but also variables derived therefrom. As a function of at least one of the operating variables, the control unit 8 controls the actuators that are assigned to the internal combustion engine 100, and to each of which corresponding actuator drives are assigned, by suitable control signals for the actuator drives.

The sensors are, for example, an air mass meter, which detects an air mass flow upstream of the compressor 14, a temperature sensor, which detects an intake air temperature, an ambient air pressure sensor, further pressure sensors, a temperature sensor, which detects the temperature of the coolant of the internal combustion engine 100, a pressure sensor which detects the intake pipe pressure downstream of the throttle valve 17, an exhaust gas sensor, which detects a residual oxygen content of the exhaust gas and whose measurement signal is characteristic of the air/fuel ratio in the cylinder Z1 in the course of combustion of the air/fuel mixture. Signals from further sensors that are necessary for the control and/or regulation of the internal combustion engine 100 and its ancillary components are identified in general terms by the reference symbol ES in FIG. 1.

Depending on the refinement, any desired subset of the specified sensors may be present, or additional sensors may also be present.

The actuators, which the control unit 8 controls by means of control signals, are, for example, the throttle valve 17, the fuel injection valve 33, the spark plug 34, the tank venting valve 66, the air admission valve 70 and the purge air pump 67.

Actuating signals for further actuators of the internal combustion engine 100 and its ancillary components are identified in FIG. 1 in general terms by the reference symbol AS.

In addition to the cylinder Z1, further cylinders are also provided, to which corresponding actuators are also assigned.

The control unit 8 may also be referred to as an engine control unit. Such control units 8, which generally contain one or more microprocessors, are known per se, and therefore details are given below only on the design which is relevant in the context of the invention, and on the method of functioning of the design.

The control unit 8 includes a computing unit 81, which is coupled to a program memory 82 and a data memory 83. The program memory 82 and the data memory 83 contain programs or data which are required for the operation of the internal combustion engine 100. Inter alia, a function for controlling the internal combustion engine 100 during a tank venting period is implemented in software in the program memory 82, in particular for determining and setting a desired value for the purge flow, and for determining the degree of loading of the activated carbon filter 61. For this purpose, control electronics are provided in the control unit 8 for controlling the purge air pump 67 and evaluating the pressure difference $\Delta APP$ built up by the purge air pump 67, as will be explained in more detail below.

With the aid of the purge air pump 67, it is possible to adjust a desired purge flow of the purge gas (HC/air mixture) from the activated carbon filter 61 for all operating points of the internal combustion engine 100. With a high HC content in the purge gas, the purge flow must be smaller than in the case of a nearly empty activated carbon filter 61. At the time of opening the tank venting valve 66, the HC content in the purge gas must be known with high accuracy, since this is taken into account in the calculation of the quantity of fuel to be injected for the current operating point of the internal combustion engine 100.

If the purge air pump 67 is operated with the tank venting valve 66 closed, the pressure difference generated across the purge air pump 67 may be determined in accordance with the following relationship:

$$\Delta P = \frac{\rho}{2}(2\pi r f)^2,$$

where
$\rho$ is the density of the purge gas, f is the rotational speed of the impeller of the purge air pump, and r is the radius of the impeller of the purge air pump.

As a result of the centrifugal forces of the purge gas in the purge air pump 67, the pressure generated at a predetermined rotational speed depends on the density of the purge gas. The densities of hydrocarbons differ from the density of air. Thus, for example, at a temperature of 0° C. and ambient pressure, the density of air is approx. 1.29 kg/m³ and the density of pure butane is 2.48 kg/m³.

If the rotational speed f is constant, then the pressure difference is proportional to the density $\rho$ and is thus proportional to the HC content in the purge gas.

If the tank venting valve 66 is closed, no purge flow flows and the pressure p_up corresponds to the ambient pressure.

Thus, by means of a brief pressure build-up by control of the purge air pump 67 with the tank venting valve 66 closed, and a predetermined rotational speed of the purge air pump 67, conclusions may be drawn from the measured pressure difference $\Delta P$ as to the HC concentration in the purge gas.

If this step is performed before the start of the actual purge phase (open tank venting valve 66), the first-time opening of the tank venting valve 66 may take place significantly faster and with a more accurate injection mass correction.

In the data memory 83 of the control unit 8, a characteristics map inter alia is stored, in which, depending on the values of the pressure difference $\Delta P$ determined, related values for the HC concentration of the purge gas are stored. The characteristics map is determined experimentally on the test bed. The values for the pressure difference $\Delta P$ are either determined in the control unit 8 from the individual pressure values P_up and P_down upstream or downstream of the purge air pump 67 by the formation of corresponding differences, or the values $\Delta P$ delivered by the differential pressure sensor are entered directly.

The principle of determining HC concentration on the basis of the differential pressure across the purge air pump also functions during the purge process in combination with a pulse width modulated activation signal (PWM signal) for the tank venting valve. For this purpose, it is only necessary to carry out the evaluation of the pressure signals in the control unit 8 at a sufficient sampling rate that is synchronous with the PWM control of the tank venting valve 66. With a suitable downstream filtering process known per se a value for the differential pressure then ensues, which is proportional to the HC concentration of the purge gas and thus to the degree of loading of the activated carbon filter 61. The degree of loading determined is used to set a desired purge air flow and for correction of the injection mass.

Moreover, the device shown in FIG. 1 may be used to detect leaks in the tank system. For this leak detection, the tank venting valve 70 is first of all closed. Activation of the purge air pump 67 then takes place, and thereupon the tank venting valve 66 is closed. After this, in turn, there is a repeated pressure measurement by means of pressure sensor 72 and/or by means of pressure sensor 71. By means of a comparison of successive pressure values, it is possible to determine whether or not there are leaks in the region of the tank system of the internal combustion engine. By means of this leak detection, which takes place under a vacuum, it is possible to detect leaks of the order of 1 mm, for example.

Figure 2:
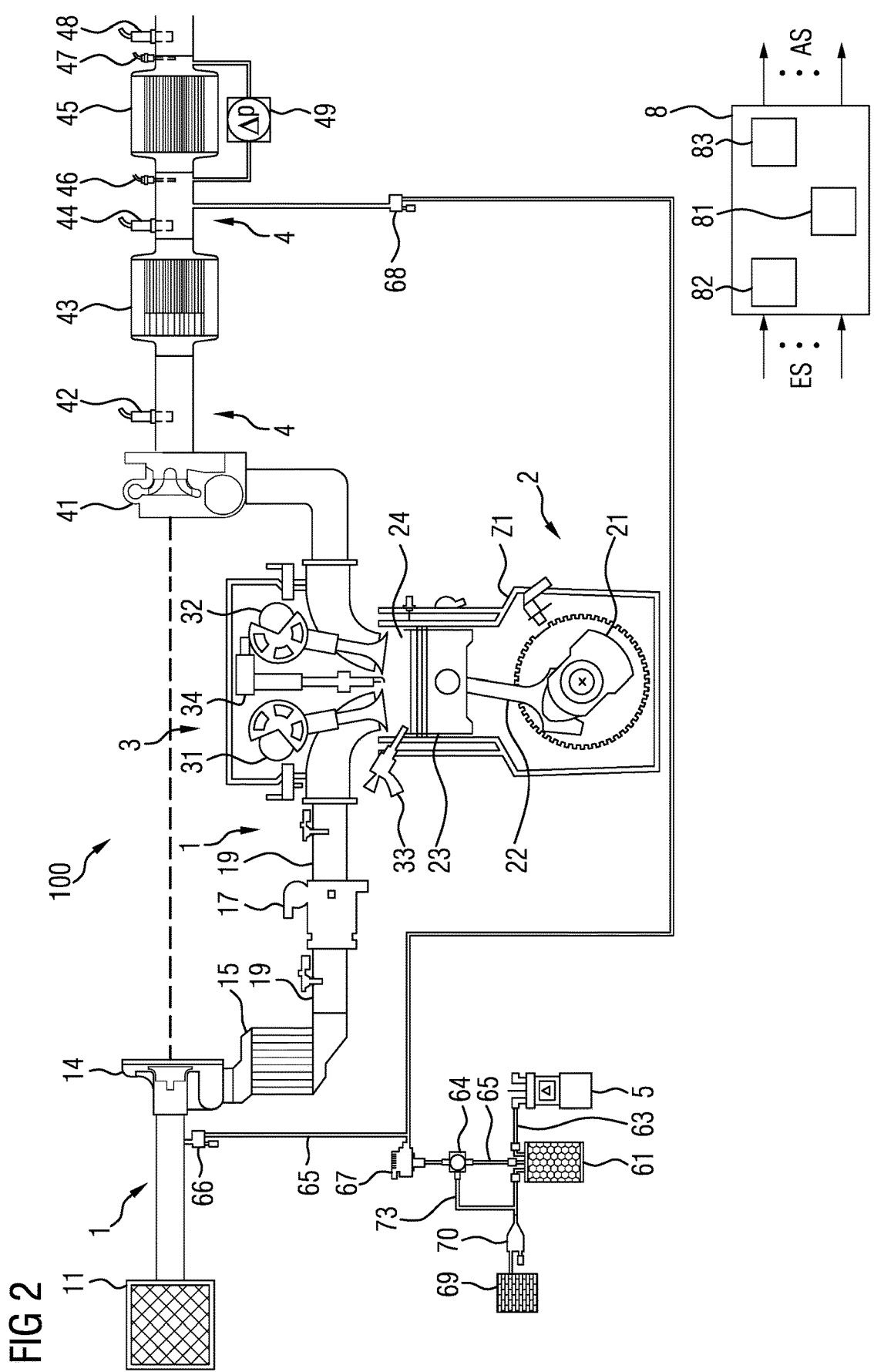
FIG. 2 shows a block diagram of a device for operating a tank ventilation system of an internal combustion engine in accordance with a first embodiment.

FIG. 2 shows a block diagram of a device for operating a tank ventilation system of an internal combustion engine in accordance with a first embodiment.

The device shown in FIG. 2 coincides in large part with the device shown in FIG. 1. Inter alia, like the device shown in FIG. 1, it has a fuel tank 5, an activated carbon filter 61 for collecting and buffering fuel vapor escaping from the fuel tank 5, a purge air pump 67 and a control unit 8.

The device shown in FIG. 2 differs from the device shown in FIG. 1 in that the outlet of the purge air pump 67 is not only connected to the intake tract in the region between the air filter 11 and the compressor 14 via a first tank venting valve 66, but is furthermore connected to the exhaust tract 4 of the internal combustion engine 100 via a secondary air valve 68. In the embodiment shown, the outlet of the purge air pump 67 is connected via the secondary air valve 68 to the exhaust tract 4 of the internal combustion engine 100 in a region upstream of a four-way catalytic converter 45 arranged in the exhaust tract 4.

This four-way catalytic converter 45 may be arranged in the exhaust tract 4 downstream of the three-way catalytic converter 43 or may be provided in the exhaust tract 4 instead of the three-way catalytic converter 43. The four-way catalytic converter 45 performs the functions of a three-way catalytic converter and of an integrated particulate filter.

The purge air passed into the exhaust tract 4 via the secondary air valve 68 is provided for heating the four-way catalytic converter and is furthermore used to regenerate a particulate filter arranged in the exhaust tract 4. This particulate filter may be an integrated component of the four-way catalytic converter 45 or may be a separate component arranged in the exhaust tract 4.

The device illustrated in FIG. 2 may be used to introduce purge air passed through the activated carbon filter 61 when the secondary air valve 68 is closed into the intake tract 1 in the region between the air filter 11 and the compressor 14 via the regeneration line 65, the changeover valve or 3/2-way valve 64 open for this purge air, the purge air pump 67 and the open tank venting valve 66.

The control signals required for this purpose are supplied by the control unit 8.

The device illustrated in FIG. 2 may furthermore be used to introduce fresh air obtained via the air filter 69 and the opened air admission valve 70 when the first tank venting valve 66 is closed into the exhaust tract 4 in the region between the three-way catalytic converter 43 and the four-way catalytic converter 45 via a fresh air path 73, the changeover valve 64 open for this fresh air, the purge air pump 67 and the open secondary air valve 68 in order to heat up the four-way catalytic converter 45 and, if required, to regenerate the particulate filter integrated into the four-way catalytic converter. The control signals required for this purpose are once again supplied by the control unit 8.

The control unit 8 produces the abovementioned control signals in such a way that the tank venting valve 66 and the secondary air valve 68 are open in different time intervals, with the result that secondary air injection via the first tank venting valve 66 does not take place simultaneously with the heating of the four-way catalytic converter 45 or the regeneration of the particulate filter via the secondary air valve 68. The heating of the particulate filter takes place during substoichiometric operation of the internal combustion engine and air injection via the secondary air valve 68. Substoichiometric operation of the internal combustion engine produces NH3, which is oxidized in the particulate filter to form NOx. The changeover valve 64 may also be operated as a mixing valve, whereby gases from the activated carbon canister are introduced into the exhaust tract 4 via the secondary air valve 68. The concentration of the purge gases is controlled in such a way, using output signals from pressure sensors, that a slightly lean mixture is injected ahead of the particulate filter, thereby oxidizing all the hydrocarbons from the activated carbon canister 61. This method may be employed when the exhaust gas temperature in the exhaust tract 4 ahead of the particulate filter is lower than the self-ignition temperature of the purge gases. This enables the particulate filter to be heated and regenerated without a rise in NOx. For reasons of safety, a flame trap may furthermore be arranged between the secondary air valve 68 and the exhaust tract 4. Such a flame trap may be an uncoated metal substrate catalyst, for example.

In an alternative use of the device shown in FIG. 2, secondary air is injected into the intake tract 4 in the region between the air filter 11 and the compressor 14 in such a way that fresh air drawn in via the air filter 69 is injected into the intake tract 4 via the opened air admission valve 70, the fresh air path 73, the changeover valve 64 open for this fresh air, the purge air pump 67 and the opened first tank venting valve 66.

Temperature sensors 46 and 47 are provided upstream and downstream of the four-way catalytic converter 45. A differential pressure former 49, which detects the difference between the pressure upstream and downstream of the four-way catalytic converter, is furthermore provided. The output signals of these temperature sensors and of the differential pressure former may be used for diagnosis of the four-way catalytic converter. By evaluation of these signals, it is possible, for example, to ascertain whether or not regeneration of the particulate filter of the four-way catalytic converter is taking place.

Figure 3:
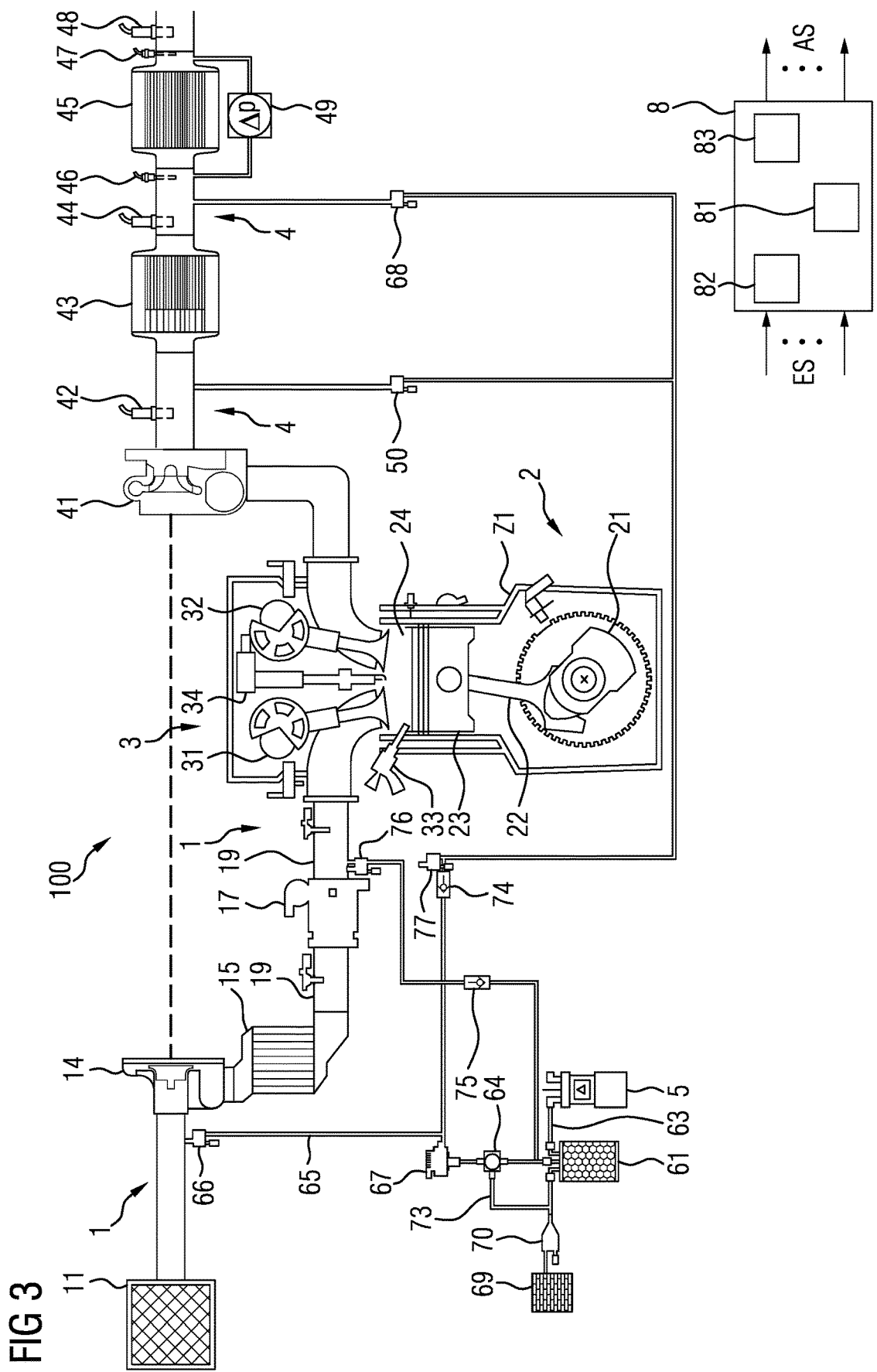
FIG. 3 shows a block diagram of a device for operating a tank ventilation system of an internal combustion engine in accordance with a second embodiment.

FIG. 3 shows a block diagram of a device for operating a tank ventilation system of an internal combustion engine in accordance with a second embodiment of the invention.

The device shown in FIG. 3 coincides in large part with the device shown in FIG. 2. Inter alia, like the device shown in FIG. 2, it has a fuel tank 5, an activated carbon filter 61 for collecting and buffering fuel vapors escaping from the fuel tank 5, a purge air pump 67 and a control unit 8.

The device shown in FIG. 3 differs from the device shown in FIG. 2 in that a check valve 74 is arranged between the outlet of the purge air pump 67 and the secondary air valve 68 and that, furthermore, the purge air outlet of the activated carbon filter 61 is fed into the intake tract in the region of the intake pipe 19 between the throttle valve 17 and the inlet port of the cylinder Z1 via a further check valve 75 and a tank venting valve 76. This allows cleaning of the activated carbon filter 61 by discharge of the purge air which is drawn in via the air filter 69 and the open air admission valve 70 into the intake pipe 19 of the intake tract 4 via the check valve 74. In this case, the changeover valve 64 for the purge air emerging from the activated carbon filter 61 is shut.

At the same time, fresh air drawn in via the air filter 69 and the open air admission valve 70 is introduced into the exhaust tract 4 in the region between the three-way catalytic converter 43 and the four-way catalytic converter 45 via the fresh air path 73, the changeover valve 64 opened for this fresh air, the purge air pump 67, the check valve 74 and the opened secondary air valve 68.

As in the embodiment shown in FIG. 2, the four-way catalytic converter 45 may likewise be arranged in the exhaust tract 4 downstream of the three-way catalytic converter 43 or, as an alternative, may be provided in the exhaust tract 4 instead of the three-way catalytic converter 43. The four-way catalytic converter 45 performs the functions of a three-way catalytic converter and of an integrated particulate filter.

The purge air passed into the exhaust tract 4 via the secondary air valve 68 is provided for heating the four-way catalytic converter and is furthermore used to regenerate a particulate filter arranged in the exhaust tract 4. This particulate filter may be an integrated component of the four-way catalytic converter 45 or may be a separate component arranged in the exhaust tract 4.

Accordingly, the device illustrated in FIG. 3 may simultaneously be used to introduce purge air from the activated carbon filter 61 as secondary air into the intake tract in the region between the throttle valve 17 and the inlet port of the cylinder Z1 and to introduce fresh air into the exhaust tract via the purge air pump 67, the check valve 74 and the opened secondary air valve 68 in order to heat up the four-way catalytic converter 45 there and, if required, also to regenerate a particulate filter arranged there. Here too, the control signals required for this purpose are supplied by the control unit 8.

Consequently, the control unit 8 produces the abovementioned control signals in such a way that the introduction of the purge air into the intake tract 1 via the check valve 75 and the introduction of fresh air via the purge air pump 67, the check valve 74 and the opened secondary air valve 68 take place simultaneously.

Moreover, the device shown in FIG. 3 has a secondary air valve 50, which opens into the exhaust tract 4 in the region between the turbine 41 and the three-way catalytic converter 43. Via this secondary air valve 50, purge air or fresh air may be introduced into the exhaust tract 4 when required.

There is furthermore the possibility in the device shown in FIG. 3 to inject purge air into the intake tract 1 in the region between the air filter 11 and the compressor 14 via the regeneration line 65 and the opened tank venting valve 66.

In all the abovementioned modes of operation, the control unit 8 provides suitable control signals to ensure that required fluid paths are opened and fluid paths that are not required are closed.

Figure 4:
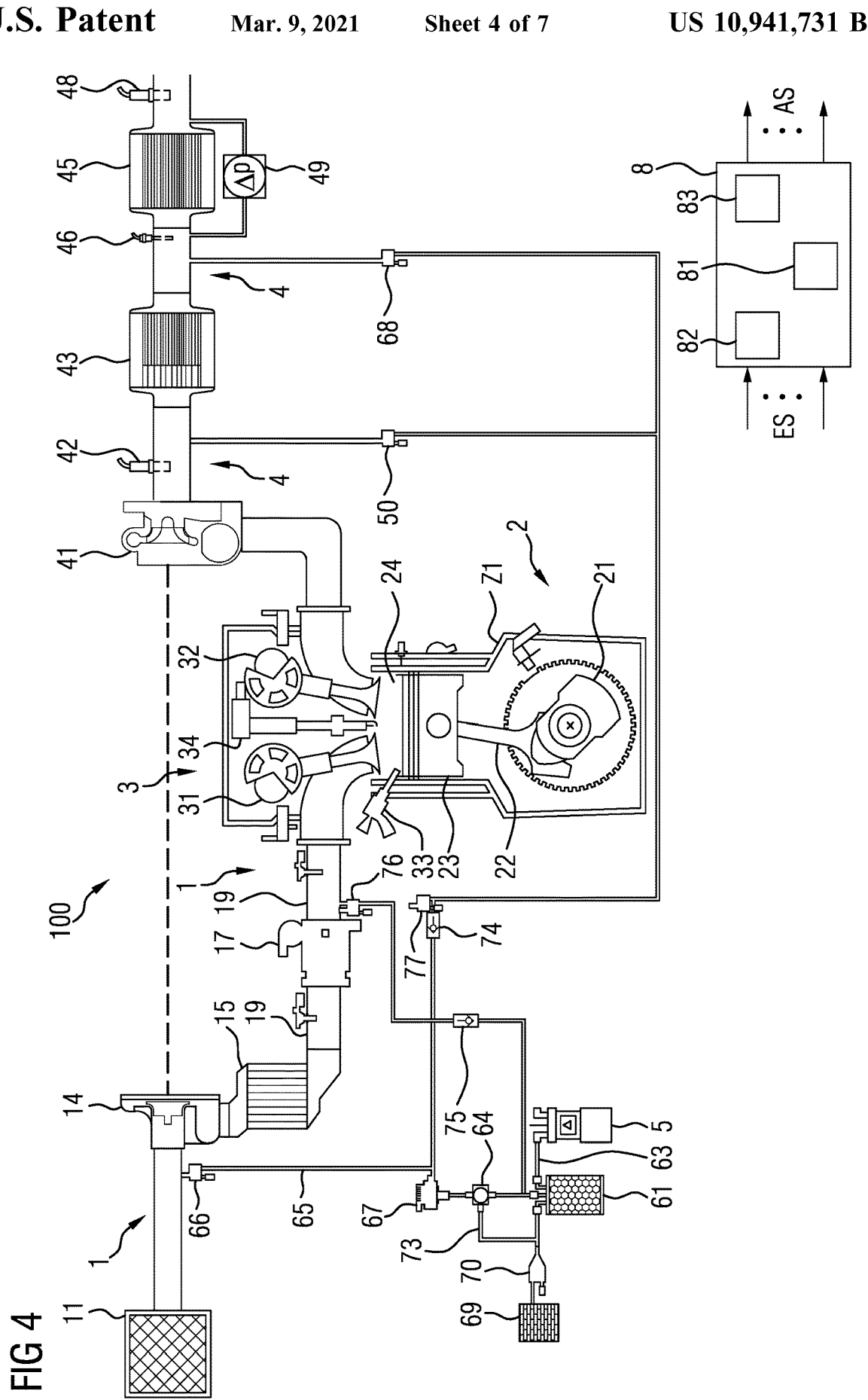
FIG. 4 shows a block diagram of a device for operating a tank ventilation system of an internal combustion engine in accordance with a third embodiment.

FIG. 4 shows a block diagram of a device for operating a tank ventilation system of an internal combustion engine in accordance with a third embodiment.

The device shown in FIG. 4 coincides in large part with the device shown in FIG. 3. Inter alia, like the device shown in FIG. 3, it has a fuel tank 5, an activated carbon filter 61 for collecting and buffering fuel vapors escaping from the fuel tank 5, a purge air pump 67 and a control unit 8.

The device shown in FIG. 4 differs from the device shown in FIG. 3 in that the purge air pump 67 is used to introduce purge air from the activated carbon filter 61 into the intake tract 1 in the region between the air filter 11 and the compressor 14 via the opened tank venting valve 66 and in that compressed air drawn in from the intake tract between the throttle valve 17 and the inlet port of the cylinder Z1 is injected into the exhaust tract 4 in the region between the three-way catalytic converter 43 and the four-way catalytic converter 45 via the opened secondary air valves 76, 77 and 68 in order to heat up the four-way catalytic converter and, when required, to clean the particulate filter present there. The valve control signals required for this operating mode are once again provided by the control unit 8.

In this case, the loading of the activated carbon filter 61 may once again be accomplished using pressure sensors (not shown) upstream and/or downstream of the purge air pump 67 and may be taken into account in the introduction of the purge air into the intake tract 1.

In the case of the third embodiment shown in FIG. 4 too, there is furthermore the possibility of introducing fresh air obtained via the fresh air path 73 and the changeover valve 64 opened for this fresh air into the intake tract 1 in the region between the air filter 11 and the compressor 14 via the regeneration line 65 and the opened tank venting valve 66 or, with the tank venting valve 66 closed, to introduce it into the exhaust tract 4 via the check valve 74, either via secondary air valve 50 or via secondary air valve 68.

There is furthermore also the possibility of introducing purge air from the activated carbon filter 61 into the intake tract 1 in the region between the throttle valve 17 and the inlet port of the cylinder Z1 via the check valve 75 and the opened secondary air valve 76.

Figure 5:
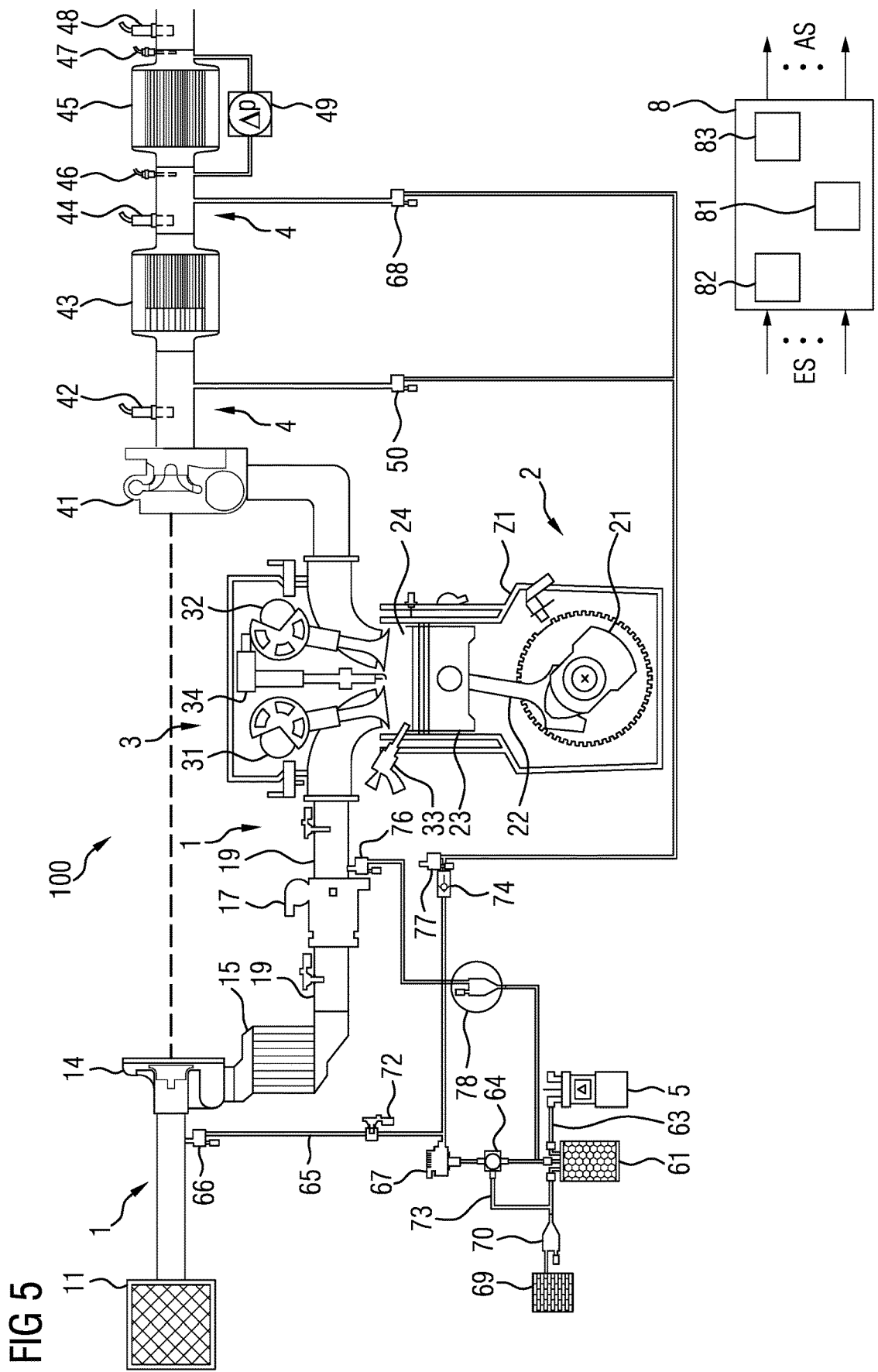
FIG. 5 shows a block diagram of a device for operating a tank ventilation system of an internal combustion engine in accordance with a fourth embodiment.

FIG. 5 shows a block diagram of a device for operating a tank ventilation system of an internal combustion engine in accordance with a fourth embodiment.

The device shown in FIG. 5 coincides in large part with the device shown in FIG. 4. Inter alia, like the device shown in FIG. 4, it has a fuel tank 5, an activated carbon filter 61 for collecting and buffering fuel vapors escaping from the fuel tank 5, a purge air pump 67 and a control unit 8.

The device shown in FIG. 5 is designed to perform leakage detection in the tank system in one operating mode. For this purpose, use is made inter alia of a pressure sensor 72 arranged in the regeneration line 65. In carrying out this leakage detection, there is first of all injection of secondary air into the intake tract 1 in the region between the air filter 11 and the compressor 14 via the regeneration line 65 and the opened tank venting valve 66. During this process, the valve 70 is closed and, if a vacuum is detected with the aid of the pressure sensor 72, the tank venting valve 66 is also closed. By observation of the pressure with the aid of the pressure sensor 72, the control unit 8 may detect whether or not there is a leak in the tank system.

Another possibility for leakage detection of very small leaks may be implemented by producing an excess pressure. The compressor 14 is used to compress the air drawn in via the air filter 11. During this process, the valves 66, 70 and 77 are closed and valve 78 is opened until an excess pressure in the tank system is detected with the aid of the pressure sensor 72. After this, valve 76 is also closed, and the pressure is observed with the aid of the pressure sensor 72. By evaluation of the pressure signals provided by the pressure sensor 72, the control unit 8 may detect whether or not there is a leak in the tank system. Since no fuel evaporates during such leakage detection, leakage detection may be carried out with a high accuracy. It is suitable for detecting 0.5 mm leaks, for example.

FIG. 6 shows a block diagram of a device for operating a tank ventilation system of an internal combustion engine in accordance with a fifth embodiment.

The device shown in FIG. 6 coincides in large part with the device shown in the previous figures. Inter alia, like the device shown in the previous figures, it has a fuel tank 5, an activated carbon filter 61 for collecting and buffering fuel vapors escaping from the fuel tank 5, a purge air pump 67 and a control unit 8.

In the device shown in FIG. 6, in contrast to the previous figures, the purge air pump 67 is arranged ahead of the activated carbon filter 61 in the fresh air path 73, namely between the air filter 69 and the activated carbon filter 61. A switching valve 79 is arranged between the outlet of the purge air pump 67 and the activated carbon filter 61. A further switching valve 62 is furthermore provided between the air filter 69 and the connecting line between the switching valve 79 and the activated carbon filter 61. A line furthermore leads from the fuel tank 5, via a high-pressure fuel pump 51 and a fuel rail 52, to the fuel injector 33. A line furthermore leads from the switching valve 79 to the secondary air valve 68.

The device shown in FIG. 6 may be operated in an operating mode in which, in pressure-charged operation, tank venting takes place during which fresh air from the air filter 11 is forced through the valve 79 and the activated carbon filter 61 using the purge air pump 67 and is then passed as purge air through the regeneration line 65 and the opened tank venting valve 66 into the intake tract 1 in the region between the air filter 11 and the compressor 14. At the same time, compressed air from the intake tract 1, from the region between the throttle valve 17 and the inlet port of the cylinder 21, is introduced into the exhaust tract 4 in the region ahead of the four-way catalytic converter 45 via the opened secondary air valve 76, a further opened secondary air valve 53 and the opened secondary air valve 68.

FIG. 7 shows a block diagram of a device for operating a tank ventilation system of an internal combustion engine in accordance with a sixth embodiment. The construction of the device illustrated in FIG. 7 coincides with the construction of the device shown in FIG. 6 but illustrates a further operating mode of this device. In this further operating mode, tank venting takes place in a suction mode, in which fresh air from the air filter 69 is passed through the opened switching valve 62 and the activated carbon filter 61 and is then passed as purge air into the intake tract 1 in the region between the throttle valve 17 and the inlet port of the cylinder Z1 through the opened valve 54 and the further opened valve 76. At the same time, fresh air drawn in from the air filter 69 is passed or injected into the exhaust tract 4 in the region ahead of the four-way catalytic converter 45 by means of the purge air pump 67 through the switching valve 79 and the opened secondary air valve 68.

LIST OF REFERENCE SIGNS

1 Intake tract
2 Engine block
3 Cylinder head
4 Exhaust tract
5 Fuel tank
6 Tank ventilation device
7 Control unit
11 Air filter
14 Compressor
15 Charge air cooler
17 Throttle valve
19 Intake pipe
21 Crankshaft
22 Connecting rod 23 Piston
24 Combustion chamber
31 Gas inlet valve
32 Gas outlet valve
33 Fuel injector
34 Spark plug
41 Turbine
42 Lambda probe
43 Three-way catalytic converter
44 Lambda probe
45 Four-way catalytic converter
46 Temperature sensor
47 Temperature sensor
48 Lambda probe
49 Differential pressure sensor
50 Secondary air valve
51 High-pressure pump
52 Fuel rail
53 Secondary air valve
54 Tank venting valve
61 Activated carbon filter
62 Switching valve
63 Connecting line
64 Changeover valve (3/2-way valve)
65 Regeneration line
66 Tank venting valve
67 Purge air pump
68 Secondary air valve
69 Air filter
70 Air admission valve
71 Pressure sensor
72 Pressure sensor
73 Fresh air path
74 Check valve
75 Check valve
76 Tank venting valve
77 Secondary air valve
78 Switching valve
79 Switching valve
81 Computing unit
82 Program memory
83 Data memory
100 Internal combustion engine
Z1 Cylinder

The invention claimed is:

1. A device for operating a tank ventilation system of an internal combustion engine, comprising: a fuel tank, an activated carbon filter, a purge air pump, a control unit, a first tank venting valve and a secondary air valve, wherein an outlet of the purge air pump is connected to an intake tract of the internal combustion engine via the first tank venting valve and connected to the exhaust tract of the internal combustion engine via the secondary air valve, and wherein the device is operable in an operating mode in which air supplied by means of the purge air pump is used for introduction of purge air into the intake tract of the internal combustion engine upstream of a compressor, and air compressed by the compressor, from a region of the intake tract arranged downstream of the compressor, is used for introduction of secondary air into the exhaust tract of the internal combustion engine.

2. The device as claimed in claim 1, wherein the outlet of the purge air pump is connected via the secondary air valve to the exhaust tract of the internal combustion engine in a region upstream of a four-way catalytic converter arranged in the exhaust tract.

3. The device as claimed in claim 2, wherein air passed into the exhaust tract of the internal combustion engine via the secondary air valve is provided in order to increase a temperature of the four-way catalytic converter.

4. The device as claimed in claim 2, wherein the air passed into the exhaust tract of the internal combustion engine via the secondary air valve is provided in order to heat and regenerate a particulate filter arranged in the exhaust tract.

5. The device as claimed in claim 4, wherein the particulate filter is part of the four-way catalytic converter.

6. The device as claimed in claim 1, wherein the control unit is configured to output control signals, on the basis of which the first tank venting valve and the secondary air valve are simultaneously opened.

7. The device as claimed in claim 1, wherein the control unit is configured to output control signals, on the basis of which the first tank venting valve and the secondary air valve are opened in different time intervals.

8. The device as claimed in claim 1, wherein the purge air pump is arranged between the activated carbon filter and the intake tract of the internal combustion engine.

9. The device as claimed in claim 1, wherein the purge air pump is arranged between an air filter and the activated carbon filter.

10. The device as claimed in claim 1, the outlet of the purge air pump is connected via the secondary air valve to the exhaust tract of the internal combustion engine in a region upstream of a three-way catalytic converter arranged in the exhaust tract.

11. The device as claimed in claim 1, wherein the device is operable in an operating mode in which air supplied by the purge air pump is used either for introduction of secondary air into the intake tract of the internal combustion engine or for the introduction of secondary air into the exhaust tract of the internal combustion engine.

12. The device as claimed in claim 1, wherein the device is operable in an operating mode in which air supplied by means of the purge air pump is used for introduction of secondary air into the exhaust tract of the internal combustion engine and, simultaneously therewith, purge air supplied from the activated carbon canister is introduced into the intake tract of the internal combustion engine.

13. The device as claimed in claim 1, wherein the device is operable in an operating mode in which heating of a particulate filter arranged in the exhaust tract takes place during substoichiometric operation of the internal combustion engine, wherein air injection takes place via the secondary air valve arranged between the purge air pump and the exhaust tract.

14. The device as claimed in claim 13, wherein a changeover valve arranged between the activated carbon canister and the purge air pump is operated as a mixing valve, whereby purge air from the activated carbon canister is introduced into the exhaust tract via the secondary air valve.

15. The device as claimed in claim 14, wherein a concentration of the purge air introduced into the exhaust tract from the activated carbon canister via the secondary air valve is controlled in such a way, using pressure sensors, that a lean mixture is introduced into the exhaust tract ahead of the particulate filter.

16. A device for operating a tank ventilation system of an internal combustion engine, comprising: a fuel tank, an activated carbon filter, a purge air pump, a control unit, a first tank venting valve and a secondary air valve, wherein an outlet of the purge air pump is connected to an intake tract of the internal combustion engine via the first tank venting valve and connected to the exhaust tract of the internal combustion engine via the secondary air valve, wherein the device is operable in an operating mode in which leakage detection of a tank system of the internal combustion engine takes place, in which purge air supplied by the purge air pump is introduced into a region of the intake tract arranged upstream of the compressor, and compressed air is fed back into the tank system from a region of the intake tract arranged downstream of the compressor.

* * * * *